May 15, 1934.   J. H. CROSBY   1,958,962
ANTIGLARE DEVICE
Filed April 3, 1933
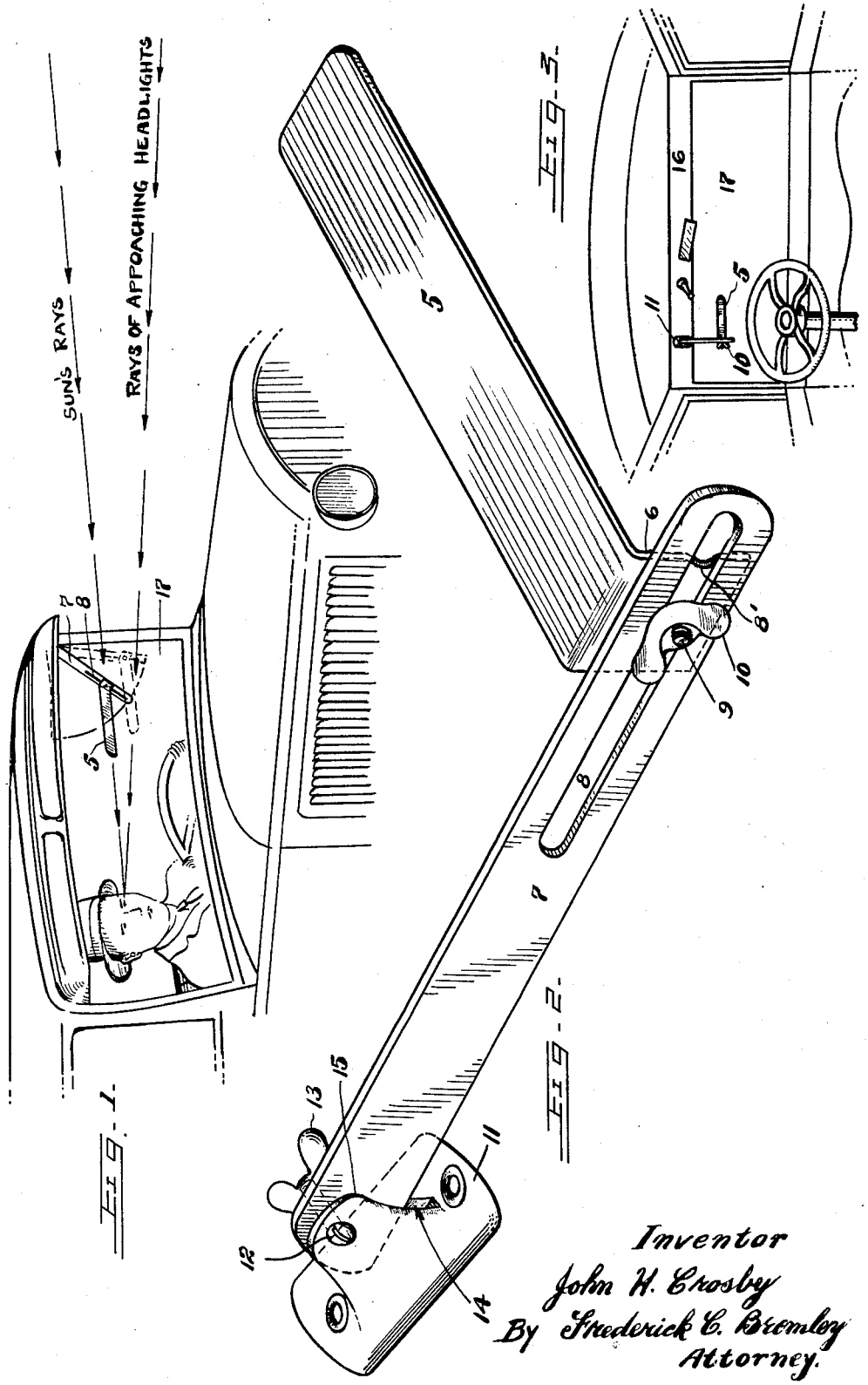
Inventor
John H. Crosby
By Frederick C. Bromley
Attorney.

Patented May 15, 1934

1,958,962

UNITED STATES PATENT OFFICE 1,958,962

ANTIGLARE DEVICE

John H. Crosby, Vero Beach, Fla.

Application April 3, 1933, Serial No. 664,151
In Canada June 11, 1932

1 Claim. (Cl. 296—97)

The invention has for its object the provision of an attachment for a motor car that will shield the driver from the glare of the headlights of an approaching automobile or from the dazzling effect of the sun, particularly when reflected by snow, etcetera.

This device is very effective for night driving and has proven to be highly efficient in shielding the driver against dazzling lights of passing cars. The invention consists essentially in the provision of a thin strip of opaque material constituting a shield that is positioned on the inner side of the windshield and adjustably supported to obstruct the glare of the sun or rays of approaching headlights.

The shield is carried by an arm and shiftable along the same. The arm is pivoted in a bracket attached to the car.

Adverting to the accompanying drawing:

Figure 1 is a perspective view of a motor car illustrating the device attached thereto.

Figure 2 is an enlarged perspective view of the device.

Figure 3 is a perspective interior view of a motor car showing the location of the device therein.

Like numerals of reference indicate corresponding parts in each of the figures throughout the drawing of the invention.

In the drawing, in which the preferred construction of the invention is shown, the reference numeral 5 denotes the shield. This consists preferably of a thin strip of spring steel suitably coated with enamel or the like. This shield is horizontally sustained and has an end bent normal to its length as at 6 so as to abut against a side of the arm 7. This arm is furnished with a lengthwise slot 8 adjacent to one end. The slot accommodates a projecting part 8' of the bent end of the arm in order to prevent the arm from twisting about the bolt 9 which is lodged in the slot and fitted with a wing nut 10 by which the arm is clamped in place. The projecting part 8' may consist of a crimp in the metal as shown in Figure 2.

The arm is pivoted in a bracket 11 by means of the bolt 12 and wing nut 13, by which it is clamped. The bracket is bifurcated at 14 and the arm is lodged in the bifurcation which is formed in the boss 15 thereof. This enables the arm to assume any position within the range of adjustment. The opposing parts of the boss formed by the bifurcation are sprung inwardly by the tightening of the wing nut on the bolt and securely clamp the arm in any position in which it may be set.

The bracket is attached to the member 16 above the windshield 17 so that the arm depends for swinging movement in a plane longitudinally of the car. Thus the shield may be brought to different positions of adjustment while still intercepting harmful rays.

It will be apparent that the shield can be adjusted lengthwise of the arm to suit different drivers or makes of cars. This invention while not interfering with the driver's vision of the roadway shields him from dazzling rays and makes driving easier and safer. When the shield is not required it can be raised by swinging the arm upwardly on its pivotal axis.

What I claim is:—

An anti-glare attachment for automobiles, composed of a bifurcated bracket for attachment over the windshield of the vehicle, a flat sided arm fitted in the bifurcation thereof and having a lengthwise slot therein, a bolt extending through said arm and through the bifurcated portion of the bracket, a nut threaded on the bolt for clamping the arm in various positions, and a shield of opaque material consisting of a thin narrow strip of uniform width having a bent end that abuts a face of the arm, said bent end being crimped for the full width of the material to fit into the slot of the arm to preclude twisting, the crimp terminating short of the opposite face of the arm, and a bolt and wing nut adjustably securing the bent end to the arm.

JOHN H. CROSBY.